United States Patent [19]

Oishi et al.

[11] Patent Number: 4,466,663
[45] Date of Patent: Aug. 21, 1984

[54] HEAD-REST FOR SEAT OF VEHICLE

[75] Inventors: Yaichi Oishi; Katsuaki Maruyama; Kenji Takano; Takami Terada; Motoi Hyodo, all of Toyota, Japan

[73] Assignees: Toyota Jidosha Kogyo Kabushiki Kaisha; Aishin Seiki Kabushiki Kaisha, both of Aichi, Japan

[21] Appl. No.: 388,425

[22] Filed: Jun. 14, 1982

[30] Foreign Application Priority Data

Jun. 26, 1981 [JP] Japan .............................. 56-95571[U]

[51] Int. Cl.³ .............................................. A47C 7/36
[52] U.S. Cl. .................................... 297/410; 297/391
[58] Field of Search ............... 297/410, 391, 353, 338, 297/61

[56] References Cited

U.S. PATENT DOCUMENTS 280,078 6/1883 Popplewell ......................... 297/410
3,764,180 10/1973 Mulholland ........................ 297/410

FOREIGN PATENT DOCUMENTS 118574 1/1970 Norway .............................. 297/391

Primary Examiner—Francis K. Zugel
Assistant Examiner—Mark Binder
Attorney, Agent, or Firm—Parkhurst & Oliff

[57] ABSTRACT

A heat-rest mounted at the upper edge of a seat back of a seat for a vehicle. The head-rest has stays in upright positions extending between upper and lower ends on upstanding brackets provided on both sides on the upper edge of the seat back frame, and a locking unit for locking the head-rest at desired height. Thus, the mounting strength of the head-rest can be reinforced while providing a good appearance without exposing the stays.

4 Claims, 4 Drawing Figures

HEAD-REST FOR SEAT OF VEHICLE

BACKGROUND OF THE INVENTION

This invention relates to a head-rest mounted at the upper edge of a seat back of a seat for a vehicle or a ship, etc. and, more particularly, to improvements in a mounting structure of a head-rest strengthened in the mounting at the upper edge of the seat back of a seat.

A conventional head-rest of this type is formed of an integral assembly of a head-rest and an elevationally movable stay. When this head-rest is observed from the front or back side, the stay is exposed between the seat back and the head-rest and does not provide a good appearance. This also lacks the degree of freedom of designing the head-rest in an artistic configuration. Further, since the stay is suported in a cantilever state, it has such drawbacks and disadvantages that its strength cannot be improved.

SUMMARY OF THE INVENTION

It is, accordingly, a primary object of this invention to provide an improved head-rest mechanism for a seat of a vehicle which can remarkably improve the mounting strength of the head-rest and hence its stay by supporting the stay at both side ends.

Another object of this invention is to provide a head-rest mechanism for a seat of a vehicle in which the stay is not exposed as observed from the front and the back sides between the upper edge of the seat back and the lower edge of the head-rest, thereby providing a good appearance.

Yet another object of this invention is to provide a head-rest mechanism for a seat of a vehicle which can be provided freely and separately from the stay in the entire shape of the head-rest, thereby remarkably increasing the degree of freedom of designing the head-rest in an artisitc manner.

Still another object of this invention is to provide a head-rest mechanism for a seat of a vehicle which can still maintain the elevational adjustment of the head-rest.

BRIEF DESCRIPTION OF THE DRAWINGS

The above and other related objects and features of the invention will be apparent from a reading of the following description of the disclosure found in the accompanying drawings wherein.

DESCRIPTION OF THE PREFERRED EMBODIMENTS

Figure 1:
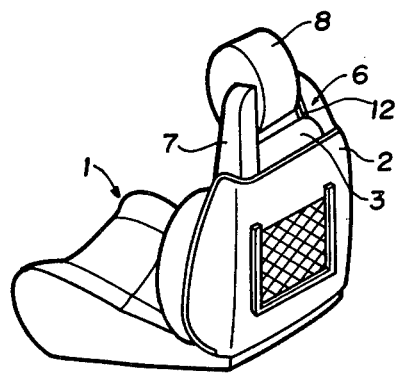
FIG. 1 is a perspective view showing one example of a seat for a vehicle employing the head-rest mechanism of the present invention.
Figure 2:
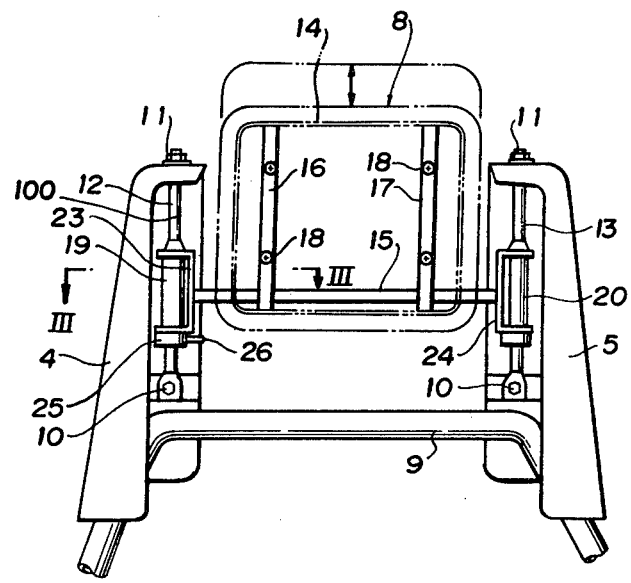
FIG. 2 is a front view showing the skeleton structure of one preferred embodiment of the head-rest mechanism constructed according to the present invention.
Figure 3:
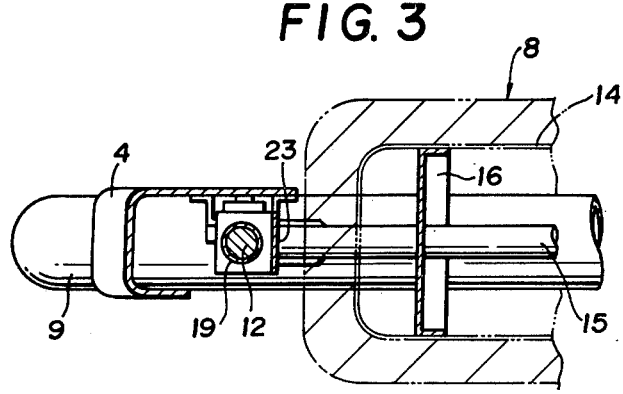
FIG. 3 is an enlarged sectional view of the mechanism taken along the line III—III in FIG. 2.

The present invention will now be described in more detail with respect to the accompanying drawings. FIGS. 1 through 3 show one preferred embodiment of the head-rest mechanism constructed according to the present invention.

At both sides of the upper edge 3 of the seat back 2 of a seat 1 are stood posts 6 and 7, which internally mount respectively brackets 4 and 5 as will be described in greater detail. Between the brackets 4 and 5 of the posts 6 and 7 is disposed a head-rest 8. As shown in FIGS. 2 and 3, the brackets 4 and 5 in the posts 6 and 7 are fixedly secured by welding or the like to both side ends on the upper edge of the seat back frame 9. Left and right upright stays 12 and 13 are fixed at both upper and lower ends with bolts 10 and nuts 11 within the respective brackets 4 and 5.

The frame 14 of the head-rest 8 is fixedly secured by a rod 15 laterally mounted and brackets 16 and 17 vertically mounted in height direction at both sides with screws 18 or the like. At both right and left ends of the rod 15 brackets 23 and 24 are fixedly secured by welding or the like, and suports 19 and 20 are also fixedly secured to the brackets 23 and 24.

The supports 19 and 20 are elevationally slidably engaged respectively with the stays 12 and 13.

In the exemplified embodiment, a number of slots 100 (one of which is illustrated in FIG. 2) perforate the stay 12 as locking holes. A locking unit 25 preferably having a pin selectively inserted into any one of the slots is mounted at the lower part of the other support 19, and the pin may be inserted into any of the slots by operating the lever 26 of the locking unit 25 in a locked state, or may be removed from the slot in a released state.

When the locking unit 25 is released, the head-rest 8 may be adjusted in height at any arbitrary height by vertically and freely moving the supports 19 and 20 along the stays 12 and 13. When the locking unit 25 is positioned at a desired height position, the head-rest 8 may be locked at the desired selected height position.

The brackets 4 and 5 exemplified may be covered with adequate sheathed member as posts 6 and 7 shown in FIG. 1.

Figure 4:
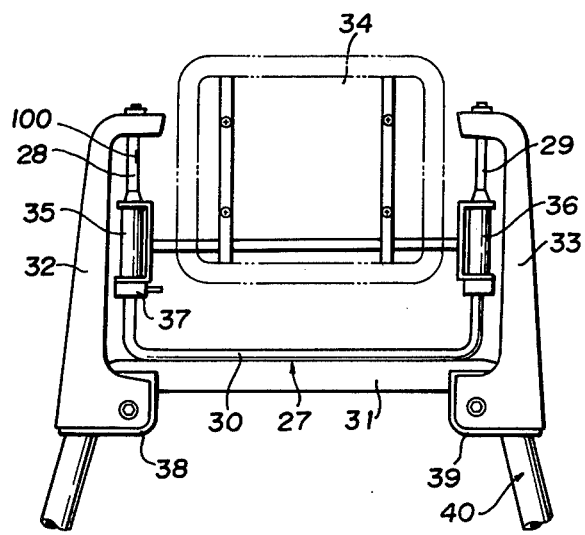
FIG. 4 is a front view of the skeleton structure of another preferred embodiment of the head-rest mechanism according to the present invention.

FIG. 4 shows another preferred embodiment of the head-rest mechanism according to the present invention. In the first embodiment described above with reference to FIGS. 1 through 3, the left and right stays 12 and 13 stand upright in a fixed manner on the brackets 4 and 5, respectively, but in this embodiment shown in FIG. 4, the vertical members at both sides of a U-shaped frame 27 are used as stays 28 and 29. Thus, the frame 27 is fixedly welded to the upper edge 31 of the seat back frame at the lateral member 30. Further, the stays 28 and 29 are secured at the upper ends to brackets 32 and 33, respectively. The suports 35, 36 secured to the frame side of the head-rest 34 are elevationally slidably engaged with the stays 28 and 29, respectively, the elevational position is selected fixedly by the locking unit 37 in the same manner as the first embodiment described above. In FIG. 4, reference numerals 38, 39 are brackets secured fixedly to both left and right sides of the upper edge 31 of the seat back frame 40.

From the foregoing description, it will be appreciated that the head-rest mechanism of the present invention is thus constructed and operated, and since the left and right stays for supporting the head-rest are fixedly secured at both upper and lower ends by the left and right side brackets at the upper edge of the seat back frame in such a manner that the stays are supported at both sides, the mounting strength of the stays and hence the mounting strength of the head-rest can be remarkably improved.

Inasmuch as the head-rest of the present invention is mounted at the left and right supports to the stays, the stays are not exposed as observed from the front and the back sides between the upper edge of the seat back and the lower edge of the head-rest, thereby providing a good appearance for the head-rest. Since the entire shape of the head-rest can be freely designed separately from the stays, the degree of the freedom of designing the head-rest can be remarkably enhanced. In addition, the function of adjusting the elevational height of the head-rest can still be retained.

What is claimed is:

1. A head-rest mechanism of a seat for a vehicle, the seat having a front face, a rear face and two sides, said head-rest mechanism comprising:

first brackets fixed in an upright position at both sides on the upper edge of a seat back frame;

stays fixed in an upright position at both upper and lower ends of said stays on said first brackets;

supports elevationally slidably engaged with said respective stays;

second brackets fixedly secured to said supports, said second brackets having upper and lower flanges connected by a bracket body to form substantially U-shaped second brackets, said second brackets being secured to said supports such that said upper and lower flanges are respectively engaged with upper and lower ends of said supports;

at least one head-rest supporting rod laterally extending between said second brackets and fixedly secured thereto; and a frame of the head-rest directly secured to said head-rest supporting rod; and locking means provided on at least one of said stays for elevationally and adjustably positioning said supports along said stays to selectively position said head-rest frame.

2. The head-rest mechanism according to claim 1, wherein said first brackets have a C-shaped cross-section that defines upper and lower flanges and the upper and lower ends of the stays are fixed to the upper and lower flanges of the first brackets.

3. The head-rest mechanism according to claim 1, wherein said head-rest frame includes a plurality of third brackets fixedly connecting said head-rest frame to said head-rest supporting rod.

4. The head-rest mechanism according to claim 1, wherein said stays are integral elements of a generally U-shaped frame, the stays being legs of the U-shaped frame that are interconnected by a base portion of the frame, the base portion being fixedly secured to the upper edge of the seat back.

* * * * *